United States Patent
Yao et al.

(10) Patent No.: US 9,200,183 B2
(45) Date of Patent: Dec. 1, 2015

(54) SELF-SPLITTING SPLICING TAPE AND DYNAMIC SPLICING METHOD USING THE SAME

(71) Applicant: BK Chemical Co., LTD, Taipei (TW)

(72) Inventors: Being-Kung Yao, Taipei (TW); Pang-Yen Wang, Taipei (TW)

(73) Assignee: BK. Chemical Co., Ltd., Taipei (TW)

( * ) Notice: Subject to any disclaimer, the term of this patent is extended or adjusted under 35 U.S.C. 154(b) by 90 days.

(21) Appl. No.: 13/646,017

(22) Filed: Oct. 5, 2012

(65) Prior Publication Data
US 2013/0089690 A1    Apr. 11, 2013

(30) Foreign Application Priority Data
Oct. 5, 2011   (TW) .............................. 100136030 A (51) Int. Cl.
*C09J 7/02*   (2006.01)
*B32B 38/04*  (2006.01)

(52) U.S. Cl.
CPC ............ *C09J 7/0296* (2013.01); *B32B 2405/00* (2013.01); *C09J 2201/128* (2013.01); *C09J 2203/342* (2013.01); *Y10T 156/1052* (2015.01); *Y10T 428/14* (2015.01); *Y10T 428/1476* (2015.01); *Y10T 428/26* (2015.01); *Y10T 428/263* (2015.01); *Y10T 428/28* (2015.01); *Y10T 428/2804* (2015.01); *Y10T 428/2848* (2015.01)

(58) Field of Classification Search
CPC .............. C09J 7/0296; C09J 2201/128; C09J 2203/342; B32B 2405/00; Y10T 428/263; Y10T 428/1476; Y10T 428/26; Y10T 428/2804; Y10T 428/2848; Y10T 428/14; Y10T 428/28; Y10T 156/1052
USPC ......................................................... 428/40.1
See application file for complete search history.

(56) References Cited

U.S. PATENT DOCUMENTS

| | | | |
|---|---|---|---|
| 6,432,241 B1 | 8/2002 | Congard et al. | |
| 6,488,228 B2 | 12/2002 | Davies et al. | |
| 7,152,825 B2 | 12/2006 | Nootbaar | |
| 2002/0056784 A1 | 5/2002 | Davies et al. | |

FOREIGN PATENT DOCUMENTS

| | | |
|---|---|---|
| EP | 0 941 954 A1 | 9/1999 |
| EP | 1544142 A1 * | 6/2005 |
| WO | WO 02/24562 A2 | 3/2002 |

* cited by examiner

*Primary Examiner* — Patricia L Nordmeyer (57) ABSTRACT

A double-sided self-splitting splicing tape includes: a base layer including a first surface and a second surface, wherein the first surface is opposite to the second surface; a first adhesive layer disposed on the first surface of the base layer; a self-splitting layer disposed on the second surface of the base layer; and a second adhesive layer disposed on the self-splitting layer. Also disclosed are methods of dynamic splicing using the double-sided self-splitting splicing tape.

15 Claims, 7 Drawing Sheets

SELF-SPLITTING SPLICING TAPE AND DYNAMIC SPLICING METHOD USING THE SAME

CROSS REFERENCE TO RELATED APPLICATIONS

This application claims priority of Taiwan Patent Application No. 100136030, filed on Oct. 5, 2011, the entirety of which is incorporated by reference herein.

BACKGROUND OF THE INVENTION

1. Field of the Invention

The present invention relates to dynamic splicing in product lines, and in particular, relates to a double-sided self-splitting adhesive splicing tape.

2. Description of the Related Art

The continuity of production of sheet materials often requires a step of splicing the finishing edge of an active unwinding roll to the leading edge of a new inactive unwinding roll. To continue processing the new inactive unwinding roll, the production line is often temporarily interrupted or even stopped so that the finishing edge of the active unwinding roll and the leading edge of the new inactive unwinding roll can be jointed together by applying a piece of a single-sided adhesive tape. The stopping of the production by such method usually consumes time, and causes a great deal of throughput losses especially when the sheet of the rolls runs at high speeds.

In order to resolve the above issues, some new types of double-sided adhesive tapes have been applied with new dynamic splicing methods while the production continues. Many new corresponding mechanical devices have been developed as well.

Before splicing, one side of the double-sided adhesive tape is attached to the second layer, positioning under the leading edge of the first layer, of the new inactive unwinding roll. The adhesive on the other side are divided into two portions, ready to connect the finishing edge of the active unwinding roll and the leading edge of the inactive unwinding roll. To do so, one portion of this adhesive is partially adhered to inner side of the leading edge of the first layer of the new inactive unwinding roll. The other portion is designed to catch the finishing edge of the active unwinding roll synchronized in a same linear speed. When two rolls are jointed end-to-head together in a dynamic mode, the first layer of the new inactive roll is carried away with tension from the winding roll and needs to be separated from the second layer. Accordingly, a self-splitting mechanism is incorporated in the structures of any of the double-sided adhesive splicing tapes for this to take place. When the first layer and the second layers are separated successfully, the dynamic splicing process is thus completed.

Each new invention comes up with its individual way of achieving such a self-splitting mechanism. The control of the peel forces of the self-splitting mechanism is critical for the success of the dynamic splicing process. These peel forces normally stay lower than the minimum forces required to tear the sheets of the roll while it has to be large enough so it will withstand all the handling processes before splicing.

U.S. Pat. No. 7,152,825 and WO 02/24562 both disclosed ways to achieve such self-splitting mechanism for dynamic splicing. U.S. Pat. No. 7,152,825 disclosed a partially coated adhesive layer while US2002/0056784 A1 or U.S. Pat. No. 6,488,228 disclosed complexity of many layers of coatings with additional barrier coating. Although EP0941954A1 depends on a self-splitting mechanism of a relatively simple, single-layer of non-tacky layer peeled away from the base layer. The uncertainty of physical and chemical nature of the base layer with potentially high porosity usually generates issues for uncontrollable self-splitting and peeling forces. Although the structure have been improved with an additional adhesion control layer in patent U.S. Pat. No. 6,432,241 B1, the self-splitting mechanism still depends on the separation of this coating from the additional non-tacky resin layer.

In spite of the many previous disclosures, the inventions of these splicing tapes remains overly complex in structures with excessive manufacturing processes and difficulty in quality control. The interfacial peel forces control between coating layers becomes very vital but tricky to manage. This is especially pertinent for delicate materials, such as paper.

As mentioned above, most of these products and disclosures depend on the unpredictable nature, splitting the delicate structures at the interfaces between coatings and many substrates. Thus, a novel dynamic splicing tape with a relatively simple but robust self-splitting mechanism which is capable of performing equally effective or better flying splice may remain undiscovered.

BRIEF SUMMARY OF THE INVENTION

An embodiment according to the invention provides a double-sided self-splitting adhesive splicing tape for dynamic splicing, including a base layer comprising a first surface and a second surface, wherein the first surface is opposite to the second surface, a first adhesive layer disposed on the first surface of the base layer, a self-splitting layer disposed on the second surface of the base layer, and a second adhesive layer disposed on the self-splitting layer.

Another embodiment according to the invention provides a double-sided self-splitting adhesive splicing tape for dynamic splicing, including a first adhesive layer, a first base layer disposed on the first adhesive layer, a second adhesive layer disposed on the first base layer, a second base layer disposed on the second adhesive layer, a third adhesive layer disposed on the second base layer, and at least a self-splitting layer disposed interposing between (1) the first base layer and the second adhesive layer, (2) the second adhesive layer and the second base layer, or (3) the second base layer and the third adhesive layer.

A further embodiment according to the invention provides a method for dynamic splicing using the double-sided self-splitting adhesive splicing tape of the invention, comprising providing an inactive unwinding roll having a first roll layer and a second roll layer; attaching the second adhesive layer of the splicing tape to the outer side of the second roll layer partially underneath the leading edge of the first layer of the inactive unwinding roll; attaching a portion of the first adhesive layer of the splicing tape to the inner side at the leading edge of the first roll layer of the inactive unwinding roll; attaching another portion of the first adhesive layer of the splicing tape to a finishing edge of an active unwinding roll which is operatively connected to a winding roll; and unwinding the first roll layer of the inactive unwinding roll by the winding roll to split the self-splitting layer of the splicing tape in the shear direction (parallel to the coating direction) into two split sub-layers such that the inactive unwinding roll is operatively connected to the winding roll.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It is understood that the following disclosure provides many different embodiments, or examples, for implementing different features of the embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Additionally, descriptive terms such as upper/lower, top/bottom, and vertical/horizontal are used for ease of description and do not provide any limitation to an absolute direction. For example, an upper layer and a lower layer may indicate a respective relationship relative to a substrate or integrated structure formed on a substrate, rather than absolute direction.

Figure 1:
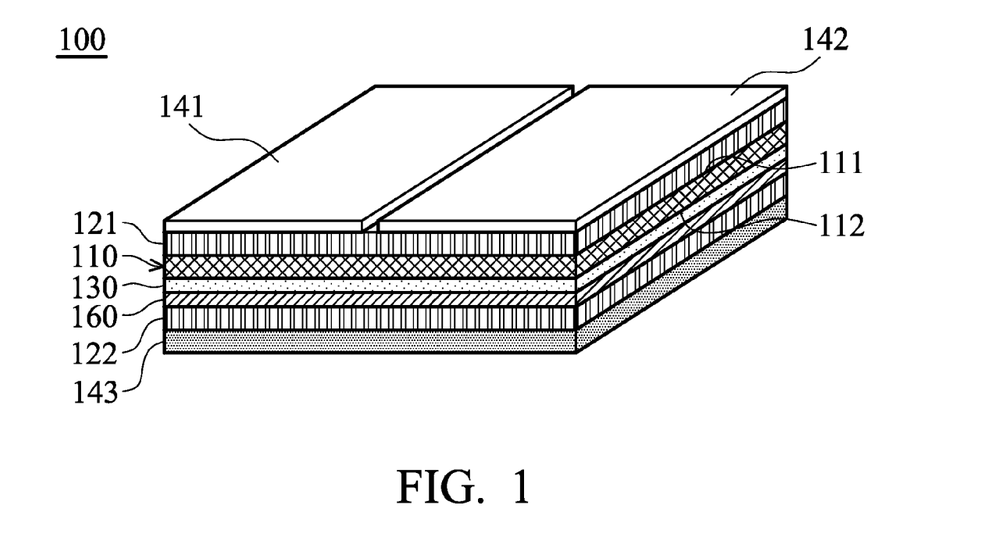
FIG. 1 is a cross sectional view of a preferred embodiment of a tape for dynamic splicing according to the present disclosure.
Figure 2:
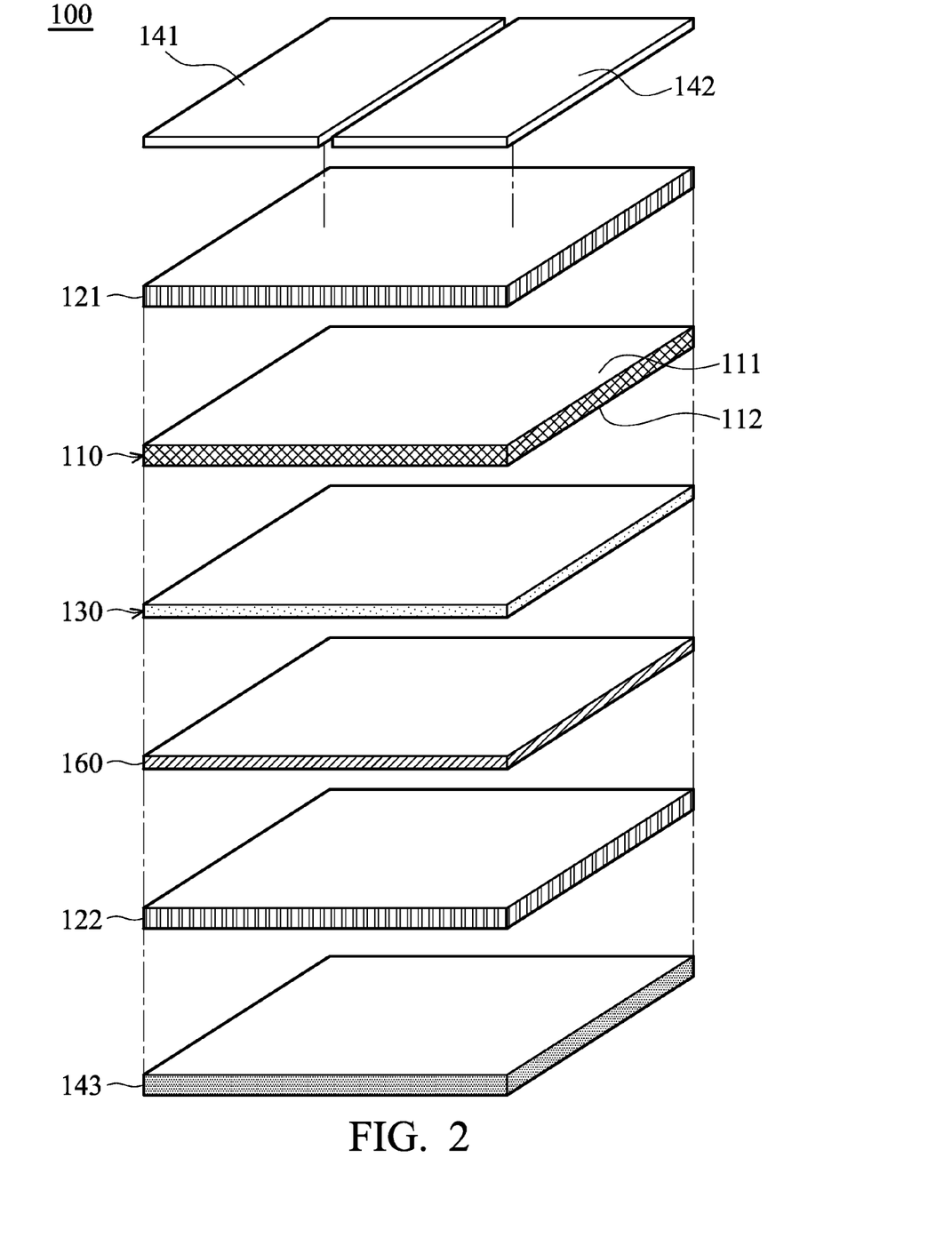
FIG. 2 is an exploded partial view showing FIG. 1.

Please refer to FIG. 1 and FIG. 2, in one embodiment, the double-sided adhesive splicing tape 100 mainly includes a base layer 110, a first adhesive layer 121, a self-splitting layer 130, an optional barrier layer 160, a second adhesive layer 122, a first release film 141, a second release film 142, a third release film 143.

The base layer 110 has a first surface 111 and a second surface 112, wherein the first surface is opposite to the second surface. Furthermore, the base layer 110 is composed of repulpable materials.

The first adhesive layer 121 is attached to the first surface 111 of the base layer 110. The self-splitting layer 130 is connected to the second surface 112 of the base layer 110, and the second adhesive layer is attached to the self-splitting layer 130 with or without the barrier layer 160 therebetween. The thickness of the first adhesive layer 121 or the second adhesive layer 122 may be in a range from 1 μm to 250 μm.

Furthermore, the first adhesive layer 121 and the second adhesive layer 122 may be formed of acrylic polymers with acrylic acid and its salts.

The self-splitting layer 130 is disposed on the second surface 112 of the base layer 110. The thickness of the self-splitting layer 130 may be in a range from 0.01 μm to 350 μm. In addition, the self-splitting layer 130 may be coated on the second surface 112 of the base layer 110 through direct coating, indirect coating, soaking, transfer coating, embossing, conventional printing, inkjet printing, laser printing, spraying, thermal sublimation, hand applications, lamination, and/or other suitable methods. Furthermore, the self-splitting layer 130 may include a first component and a second component. The first component may include ethylene glycol, poly(ethylene glycol), glycerin, ethylene-vinyl acetate copolymer, polyethylene, ethylene acrylate copolymer, polypropylene, polyurethane, polyester, natural or synthetic rubber, rosin, poly acrylate, poly(vinyl acetate), poly(vinyl alcohol), poly(vinyl pyrrolidon), poly(vinyl pyridine), maleic anhydride and its copolymers, gelatin, gum arabic, poly (acrylic acid) and its salts, polyethylenimine, poly(diethyl diallyl ammonium chloride), cellulose with various substitute functional groups, polyacrylates with various substitute functional groups, siloxane copolymers, or mixture thereof, and the second component may include plaster powder, titanium dioxide powder, polystyrene particles, polymethylmethacrylate particles, aluminum oxide particles, iron oxide particles, metal particles, metal oxide particles, graphite flakes, mica powders, pearl flakes, pearlescent pigments, wax powder, pigment particles, or suitable combinations thereof.

Still referring to FIG. 1, the first release film 141 and the second release film 142 are respectively attached to the first adhesive layer 121 in a detachable manner, and the first release film 141 and the second release film 142 are adjacent to each other. That is to say, the first release film 141 and the second release film 142 are attached to the first adhesive layer 121 in a juxtaposed position.

The third release film 143 is attached to the second adhesive layer 122 in a detachable manner.

The operation procedure of dynamic splicing for adhesive tapes, paper, plastic films, fabrics, woven materials, non-woven materials, and/or other suitable materials using the double-sided adhesive splicing tape 100 will now be explained.

Figure 4A:
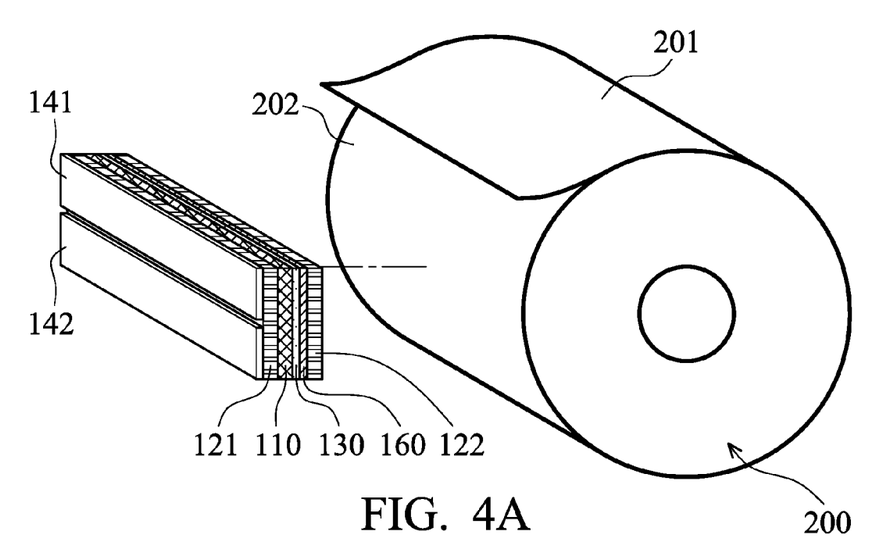
FIG. 4A is a schematic view showing a step of the operation.
Figure 4B:
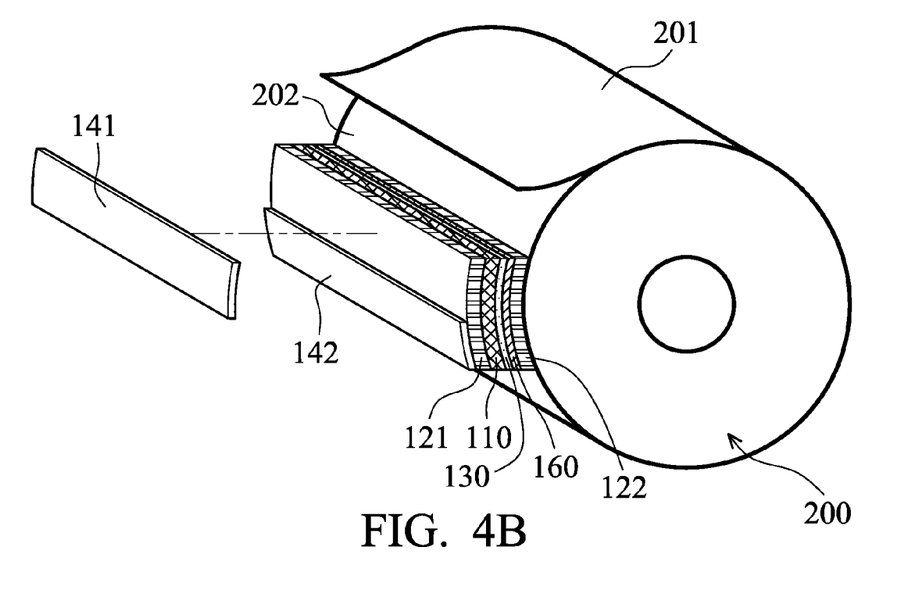
FIG. 4B is a schematic view showing another step of the operation.
Figure 5:
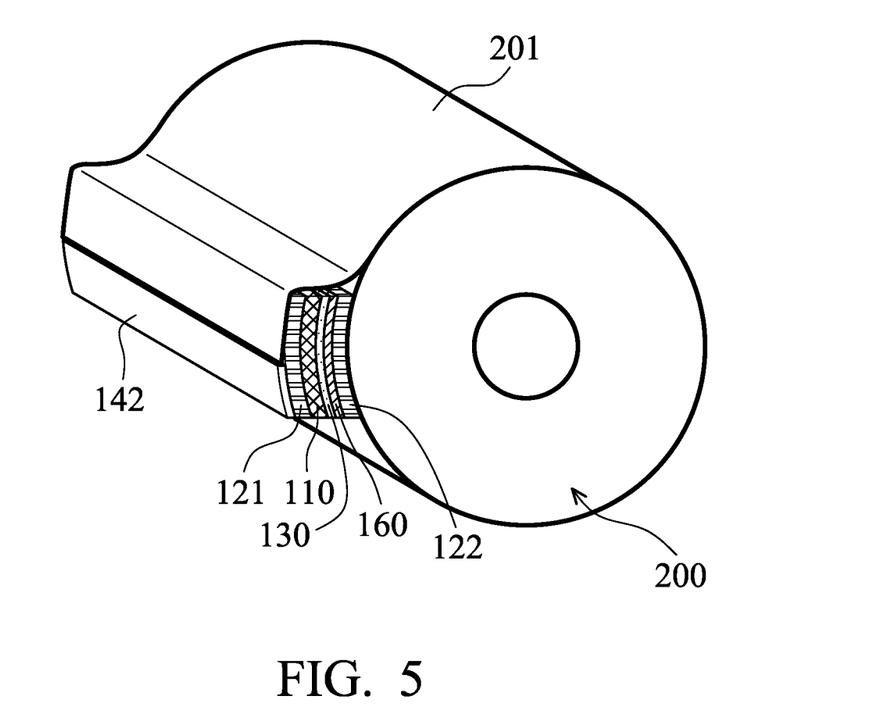
FIG. 5 is a schematic view showing yet another step of the operation.

First, the third release film 143 of the double-sided adhesive splicing tape 100 is peeled off from the second adhesive layer 122, so as to expose the second adhesive layer 122. Then as shown in FIG. 4A, the second adhesive layer 122 is attached to the second roll layer 202 of the inactive unwinding roll 200. Referring to FIG. 4B, the first release film 141 of the double-sided adhesive splicing tape 100 is peeled off from the first adhesive layer 121, and a portion of the first adhesive layer 121 is attached to the inner side of the leading edge of the first roll layer 201 of the inactive unwinding roll 200, thus giving the results as shown in FIG. 5.

Figure 6A:
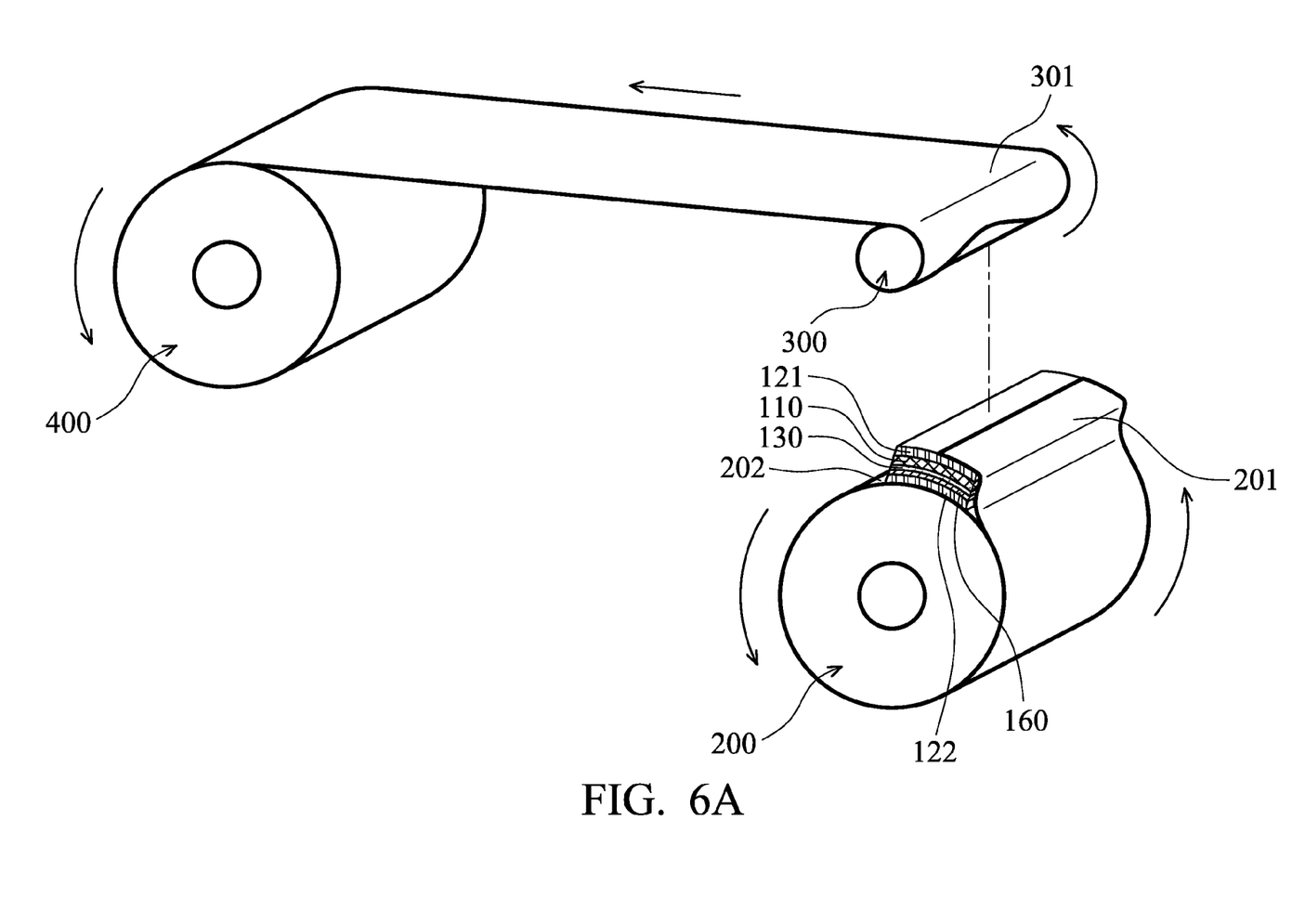
FIG. 6A is a schematic view showing an operating process of dynamic splicing in the present disclosure.
Figure 6B:
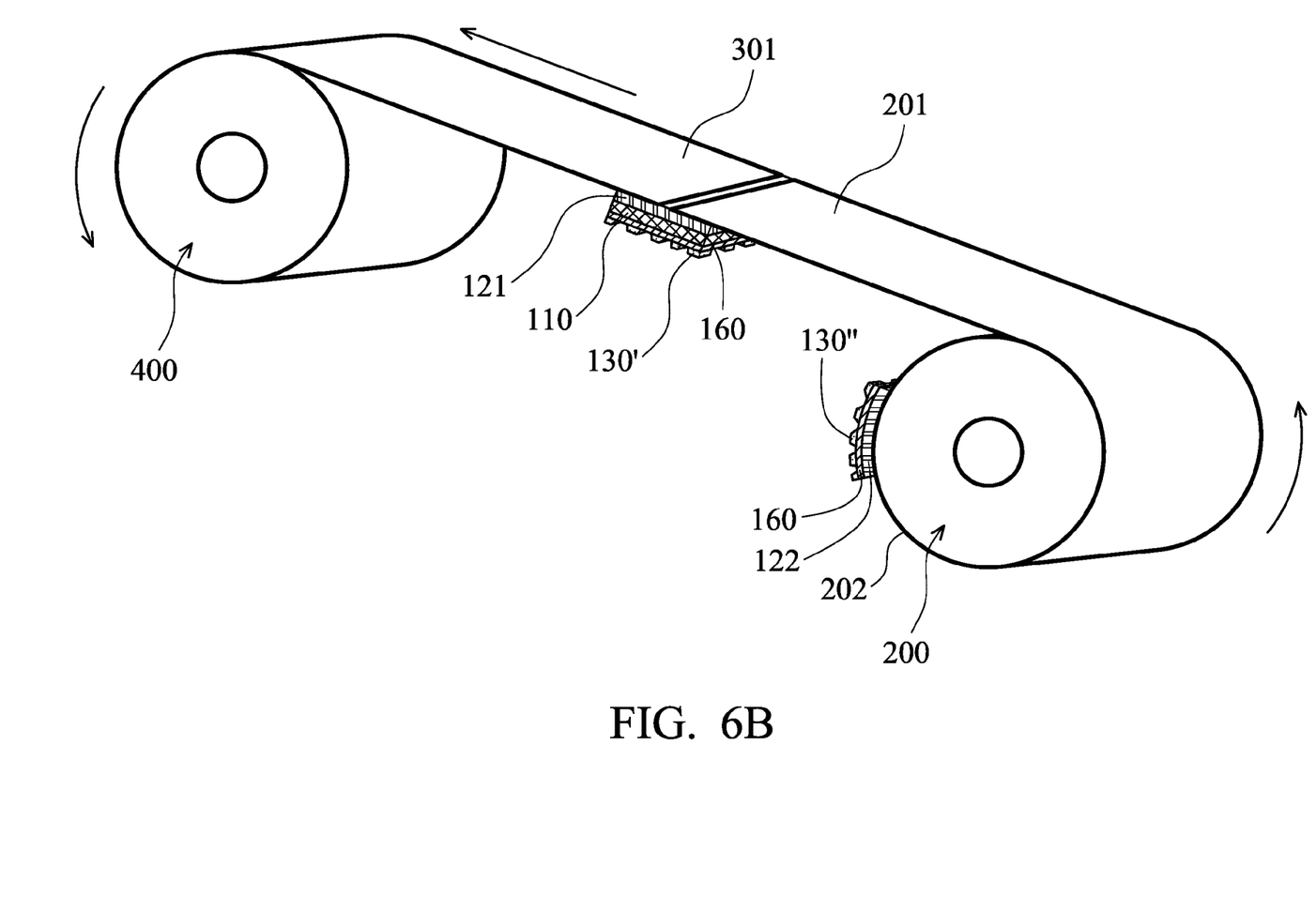
FIG. 6B a schematic view showing another operating process of dynamic splicing in the present disclosure.

Next as in FIG. 6A, before the material is about to be totally unwound by the active unwinding roll 300, the second release film 142 of the double-sided adhesive splicing tape 100 on the inactive unwinding roll 200 is peeled off, and the linear running sheet speeds of both the inactive unwinding roll 200 and the active unwinding roll 300 are synchronized. Then, by applying pressure upon contact, the finishing edge 301 of the active unwinding roll 300 which is operatively connected to the winding roll 400 is attached to another portion of the first adhesive layer 121. As shown in FIG. 6B, as the winding process of the winding roll 400 drives the first roll layer 201 forward, the self-splitting layer 130 of the double-sided adhesive splicing tape 100 in the shear direction (parallel to the coating direction) splits into two sub-layers, thus separating the temporarily linked first roll layer 201 and second roll layer 202. Thus, the inactive unwinding roll 200 now becomes a new, active unwinding roll. As mentioned above, the self-splitting layer 130 is disposed between the base layer 110 and the second adhesive layer 122, and the splitting in the shear direction (parallel to the coating direction) will result in a $1^{st}$ split sub-layer 130*, covering the base layer 110, and a $2^{nd}$ split sub-layer 130**, covering the second adhesive layer 122. The average peel force value of a splitting the self-splitting layer 130 in the shear direction (parallel to the coating direction) may be in a range from 5 grams to 400 grams per inch-width, and smaller than the peel force strength of each individual layer-layer interface and also the cohesion strength of each single layer.

These peel forces of the interfaces and the layers may include: (i) the average interface split forces of the first adhesive layer 121 to the surface of the first roll layer 201 and the finishing edge 301 of the active unwinding roll 300; (ii) the average interface split force of the second adhesive layer 122 to the surface of the second roll layer 202 of the inactive unwinding roll 200; (iii) the average interface split force of the first adhesive layer 122 to the surface of the base layer 110; (iv) the average interface split force of the self-splitting layer 130 to the surface of the base layer 110; (v) the average interface split force of the second adhesive layer 122 to the surface of the self-splitting layer 130; (vi) the average interface split force of the optional barrier layer 160 to the self-splitting layer 130; (vii) the average interface split force of the second adhesive layer 122 to the optional barrier layer 160; (viii) the peel forces breaking the first adhesive layer 121, the base layer 110, the second adhesive layer 122, and the optional barrier layer 160, cohesively; (ix) the peel forces of tearing the roll materials, especially paper, of the active unwinding roll 300 and inactive unwinding roll 200 cohesively Accordingly, the self-splitting layer 130 will prevent the tearing of the processing roll materials, any splits between layers, or any self-breakage of each individual layer, by the splitting of its own in the shear direction (parallel to the coating direction).

Note that the self-splitting layer 130 at room temperature is not tacky. The two thinner split sub-layers, the $1^{st}$ self-splitting sub-layer 130* and the $2^{nd}$ self-splitting sub-layer 130**, will not adhere to any roll materials while the sub-layers are in between. Note that neither the contact surfaces of the roll materials, nor the surfaces of any subsequent processing machine or tools will be adhered to or damaged by the sub-layer when the roll are unwound again.

The self-splitting mechanism with controlled peel forces in this disclosure can be achieved by coating as few as one single self-splitting layer, potentially saving many manufacturing processing steps and uncertainty.

It is noted that the exemplary embodiments of double-sided adhesive splicing tape 100 are not intended to be limiting.

Figure 3A:
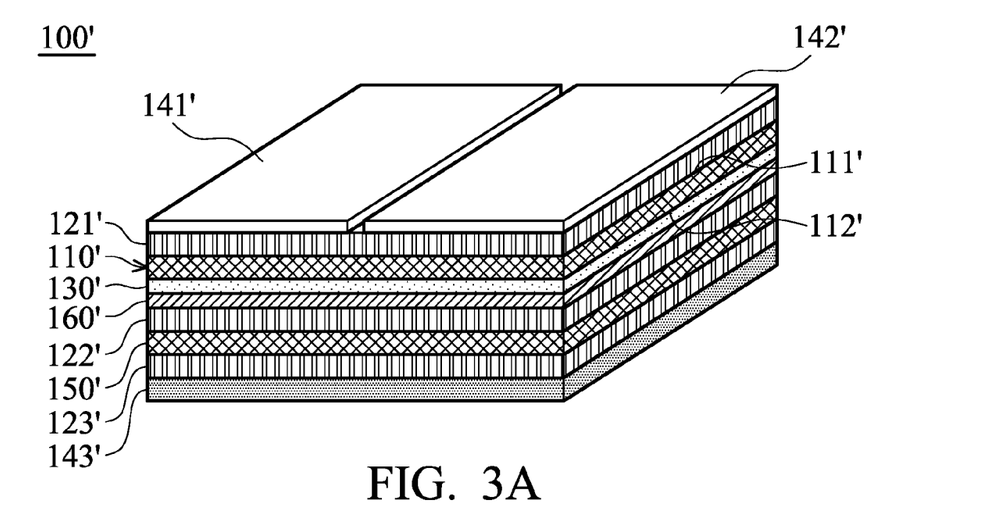
FIG. 3A and FIG. 3B respectively illustrate the cross sectional views of other preferred embodiments of the present disclosure.

For example, referring to FIG. 3A, the double-sided adhesive splicing tape 100' according to another embodiment may further include a second base layer 150' and a third adhesive layer 123' to form another embodiment of the double-sided adhesive splicing tape structure.

Please refer to FIG. 3A, which is yet another embodiment according to the invention, wherein the double-sided adhesive splicing tape structure may include a first adhesive layer 121', a base layer 110', a self-splitting layer 130', an optional barrier layer 160', a second adhesive layer 122', a second base layer 150', a first release film 141', a second release film 142', and a third release film 143'.

Similarly, the self-splitting layer can be interposed between the second base layer 150' and the third adhesive layer 123. Please refer to FIG. 3B, which is another embodiment according to the invention, wherein the double-sided adhesive splicing tape 100" may include a first adhesive layer 121", a base layer 110", a second adhesive layer 122", a second base layer 150", a self-splitting layer 130", an optional barrier layer 160", a third adhesive layer 123", a first release film 141", a second release film 142", and a third release film 143".

Furthermore, a barrier layer 160 can be optionally disposed between the second adhesive layer 122 and the self-splitting layer 130 in order to prevent the adhesives of the second adhesive layer from diffusing into the self-splitting layer 130, which may change the peel force value of splitting the self-splitting layer 130 in the shear direction (parallel to the coating direction). Preventing the self-splitting layer 130 from possible inter-diffusion, the barrier layer 160 is utilized to maintain the stability of the peel force value of splitting the self-splitting layer 130 in the shear direction (parallel to the coating direction). The material of the barrier layer 160 may comprise cellulose with various substituted functional groups, polyurethane, polyester, polyvinyl chloride, polyvinylidene chloride, polyvinyl acetate, polyvinyl alcohol, polyvinyl butyral, polyvinyl pyrrolidon, or combinations. The thickness of the barrier layer may be in a range from 0.1 μm to 100 μm.

Figure 3B:
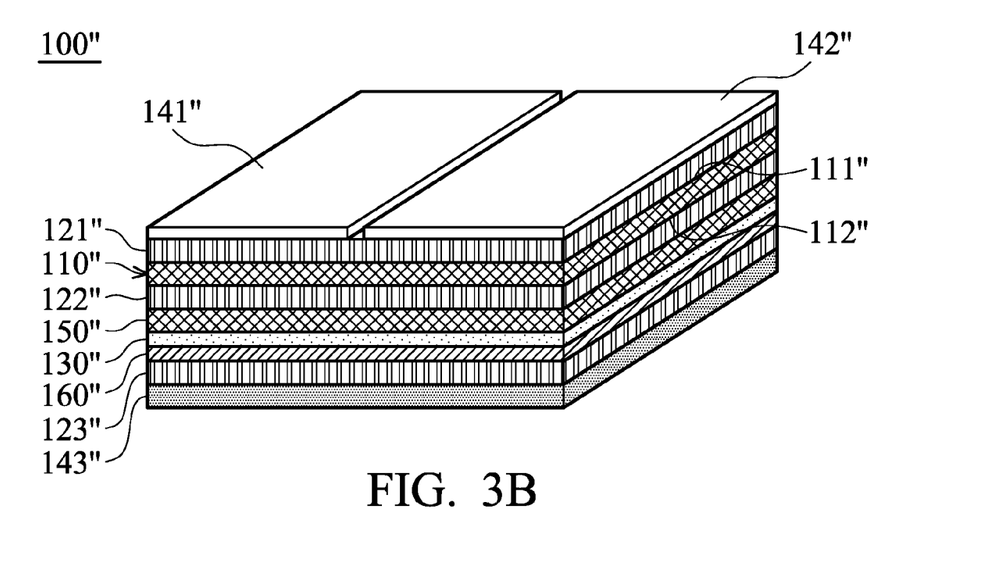

Other elements, features, and operation methods of the double-sided adhesive splicing tape 100', 100" are essentially the same as the double-sided adhesive splicing tape 100, and will not be repeated here for the sake of brevity.

The double-sided adhesive splicing tape structure according to the invention meets industrial needs for roll dynamic splicing by its the physical and chemical features and its ability to control average peel force value of splitting the self-splitting layer 130 in the shear direction (parallel to the coating direction). Accordingly, adherence or damage to the roll materials or surfaces of equipment is prevented.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A double-sided self-splitting adhesive splicing tape for dynamic splicing, comprising:
   a base layer comprising a first surface and a second surface, wherein the first surface is opposite to the second surface;
   a first adhesive layer disposed on the first surface of the base layer;
   a self-splitting layer disposed on the second surface of the base layer; and
   a second adhesive layer disposed on the self-splitting layer, wherein the self-splitting layer splits into two sub-layers along the shear direction inside the self-splitting layer after the dynamic splicing.

2. The double-sided self-splitting adhesive splicing tape for dynamic splicing as claimed in claim 1, further comprising a first release film and a second release film, wherein the first release film and the second release film are detachably connected to the first adhesive layer, respectively, and are adjacent to each other.

3. The double-sided self-splitting adhesive splicing tape for dynamic splicing as claimed in claim 1, further comprising a third release film, wherein the third release film is detachably connected to the second adhesive layer.

4. The double-sided self-splitting adhesive splicing tape for dynamic splicing as claimed in claim 1, wherein the base layer comprises repulpable materials, water-soluble polymers, water-dispersible polymers, cellulose, paper materials, or combinations thereof.

5. The double-sided self-splitting adhesive splicing tape for dynamic splicing as claimed in claim 1, wherein a thickness of the self-splitting layer is in a range from 0.01 µm to 350 µm.

6. The double-sided self-splitting adhesive splicing tape for dynamic splicing as claimed in claim 1, wherein the self-splitting layer comprises a combination of a first component and a second component, wherein the first component comprises ethylene glycol, poly(ethylene glycol), glycerin, poly(ethylene-vinyl acetate), polyethylene, ethylene acrylate copolymer, polypropylene, polyurethane, polyester, natural or synthetic rubber, rosin, polyacrylate, poly(vinyl acetate), poly(vinyl alcohol), poly(vinyl pyrrolidon), poly(vinyl pyridine), poly(maleic anhydride), gelatin, gum arabic, poly (acrylic acid) and its salts, poly(ethylene oxide), polyethylenimine, poly(diethyl diallyl ammonium), cellulose with functional groups, polyacrylates with functional groups, siloxane polymers, or copolymers and mixture thereof, and the second component comprises plaster powder, titanium dioxide powder, polystyrene particles, polymethylmethacrylate particles, aluminum oxide particles, iron oxide particles, metal particles, metal oxide particles, pearl particles, pearlescent particles, wax powder, pigment particles, or combinations thereof.

7. The double-sided self-splitting adhesive splicing tape for dynamic splicing as claimed in claim 1, wherein an average peel force value of splitting the self-splitting layer in the shear direction, which is parallel to the coating direction, is in a range from 5 grams to 400 grams per inch-width.

8. A method for dynamic splicing using the double-sided self-splitting adhesive splicing tape of claim 1, comprising:
    providing an inactive unwinding roll having a first roll layer and a second roll layer adjacent to the first roll layer;
    attaching the second adhesive layer of the splicing tape to an outer side of the second roll layer underneath a leading edge of the inactive unwinding roll;
    attaching a portion of the first adhesive layer of the splicing tape to the inner side of the first roll layer at the leading edge of the inactive unwinding roll;
    attaching another portion of the first adhesive layer of the splicing tape to a finishing edge of an active unwinding roll which is operatively connected to a winding roll; and
    rolling the first roll layer of the inactive unwinding roll by the winding roll to split anyone of the self-splitting layers of the splicing tape in the shear direction, which is parallel to the coating direction, into at least two split sub-layers such that the inactive unwinding roll is operatively connected to the winding roll.

9. A double-sided self-splitting adhesive splicing tape for dynamic splicing, comprising
    a first adhesive layer;
    a first base layer disposed on the first adhesive layer;
    a second adhesive layer disposed on the first base layer;
    a second base layer disposed on the second adhesive layer;
    a third adhesive layer disposed on the second base layer; and
    at least a self-splitting layer disposed interposing between (1) the first base layer and the second adhesive layer, (2) the second adhesive layer and the second base layer, or (3) the second base layer and the third adhesive layer,
    wherein the self-splitting layer splits into two sub-layers along the shear direction inside the self-splitting layer after the dynamic splicing.

10. The double-sided self-splitting adhesive splicing tape for dynamic splicing as claimed in claim 9, further comprising a first release film and a second release film, wherein the first release film and the second release film are detachably connected to the first adhesive layer, respectively, and are adjacent to each other.

11. The double-sided self-splitting adhesive splicing tape for dynamic splicing as claimed in claim 9, further comprising a third release film, wherein the third release film is detachably connected to the second adhesive layer.

12. The double-sided self-splitting adhesive splicing tape for dynamic splicing as claimed in claim 9, wherein the base layer comprises repulpable materials, water-soluble polymers, water-dispersible polymers, cellulose, paper materials, or combinations thereof.

13. The double-sided self-splitting adhesive splicing tape for dynamic splicing as claimed in claim 9, wherein a thickness of the self-splitting layer is in a range from 0.01 µm to 350 µm.

14. The double-sided self-splitting adhesive splicing tape for dynamic splicing as claimed in claim 9, wherein the self-splitting layer comprises a combination of a first component and a second component, wherein the first component comprises ethylene glycol, poly(ethylene glycol), glycerin, poly(ethylene-vinyl acetate), polyethylene, ethylene acrylate copolymer, polypropylene, polyurethane, polyester, natural or synthetic rubber, rosin, polyacrylate, poly(vinyl acetate), poly(vinyl alcohol), poly(vinyl pyrrolidon), poly(vinyl pyridine), poly(maleic anhydride), gelatin, gum arabic, poly (acrylic acid) and its salts, poly(ethylene oxide), polyethylenimine, poly(diethyl diallyl ammonium), cellulose with functional groups, polyacrylates with functional groups, siloxane polymers, or copolymers and mixture thereof, and the second component comprises plaster powder, titanium dioxide powder, polystyrene particles, polymethylmethacrylate particles, aluminum oxide particles, iron oxide particles, metal particles, metal oxide particles, pearl particles, pearlescent particles, wax powder, pigment particles, or combinations thereof.

15. The double-sided self-splitting adhesive splicing tape for dynamic splicing as claimed in claim 9, wherein the average peel force value of splitting the self-splitting layer in the shear direction, which is parallel to the coating direction, is in a range from 5 grams to 400 grams per inch-width.

* * * * *